WIRELESS REMOTE CONTROL SYSTEM

Filed June 9, 1960

INVENTOR:
VAN R. GIBSON, JR.
BY Joseph Levinson
HIS ATTORNEY.

United States Patent Office 3,047,778

Patented July 31, 1962

3,047,778

WIRELESS REMOTE CONTROL SYSTEM

Van R. Gibson, Jr., North Syracuse, N.Y., assignor to General Electric Company, a corporation of New York Filed June 9, 1960, Ser. No. 34,958
4 Claims. (Cl. 317—138)

Figure 1:
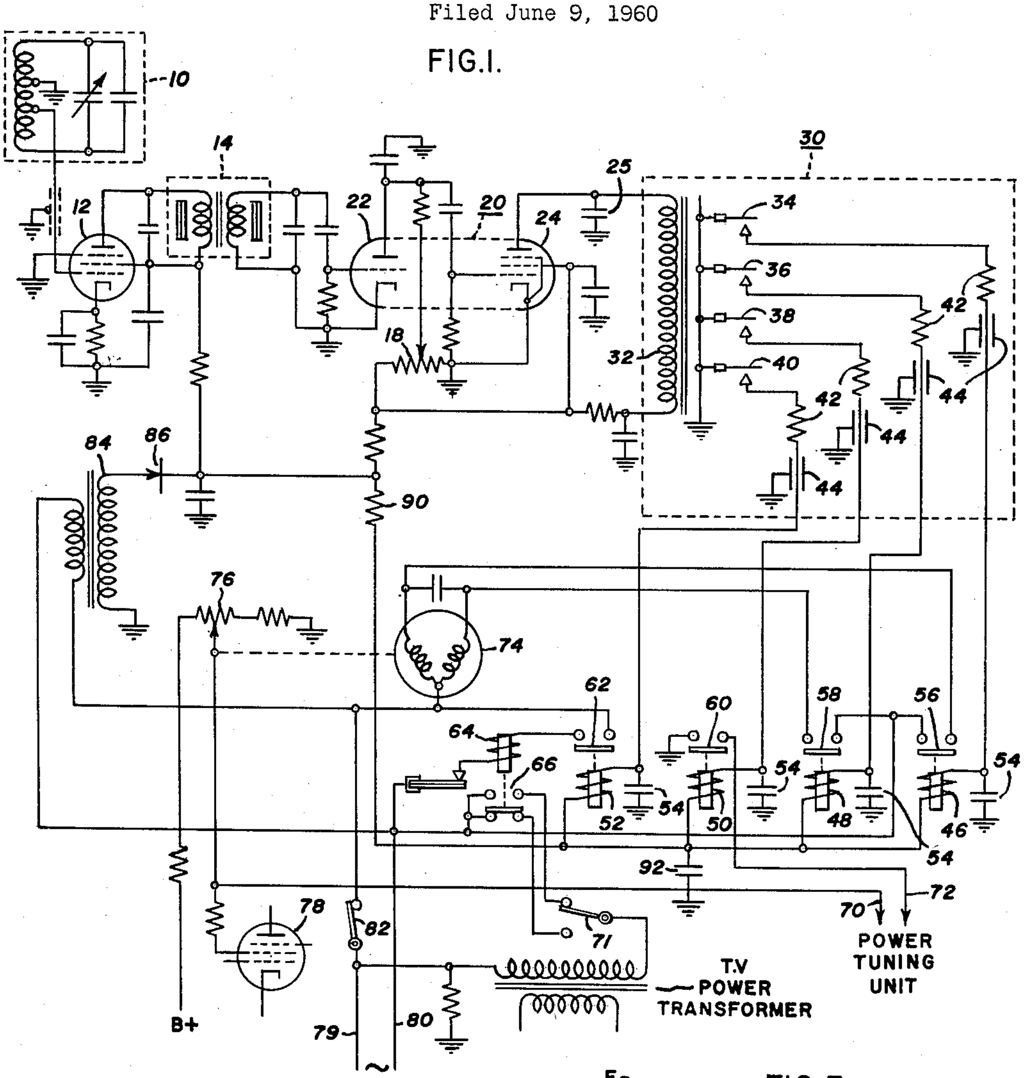

This invention relates to a wireless remote system, and more particulraly to a receiver which is actuated remotely for controlling various functions in television receivers.

One of the major difficulties encountered in remote control systems which are suitable for performing a plurality of functions resides in the difficulty of preventing the system from being actuated by noise or other spurious signals. A further problem which is closely related to the spurious activation by unwanted signals and noise problems relates to the complexity of the equipment required to reduce such unwanted actuations.

It is an object of this invention to provide a remote control receiver which does not respond to noise and other spurious signals.

It is a further object of this invention to provide a receiver for a remote control system which performs a plurality of control functions with minimum circuitry.

These and other objects of this invention will be more clearly understood from the following description taken in connection with the accompanying drawing and its scope will be apparent from the appended claims.

Figure 2:
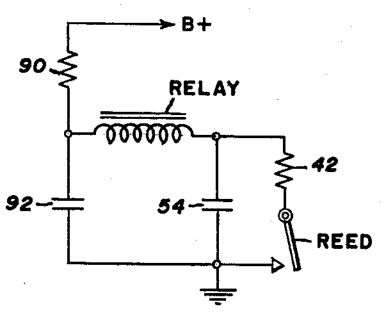
Figure 3:
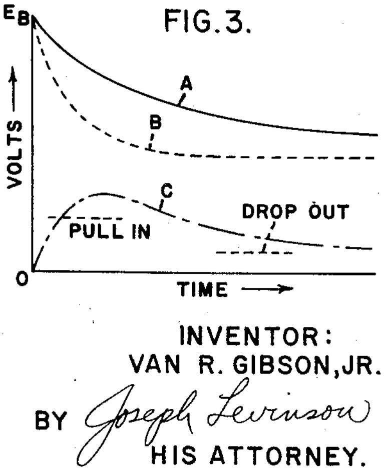

In the drawings,

FIGURE 1 is a schematic diagram of the novel remote control receiver embodied in this invention, FIGURE 2 is a schematic diagram useful in explaining the operation of the relay circuit in the remote receiver, and FIGURE 3 shows a series of voltage curves which are utilized to explain the operation of the relay circuit of FIGURE 2.

Referring to the drawings, FIGURE 1 shows a complete schematic diagram of the remote control system which includes an antenna assembly 10, an RF amplifier 12, a double tuned interstage transformer 14, and a dual purpose tube 20 having a triode section 22 and an amplifier-limiter section 24. The aforesaid portion of the receiver will be described only briefly since its operation will be readily understood by those skilled in the art. Signals which are transmitted by a remote transmitter are picked up by the antenna assembly 10 which consists of a ferrite rod having a fairly high Q with a variable trimmer capacitor thereacross for tuning the antenna circuit. The ferrite rod is center-tap grounded to balance out electrostatic pick up which is present from the high voltage and horizontal sweep circuits of the television receiver. The grid of the radio frequency amplifier 12 has the received signal applied thereto from the antenna assembly 10, amplified thereby and transferred by a double-tuned intermeditae stage transformer 14 to the grid of the triode detector section 22 of the tube 20. The double-tuned interstage transformer 14 prevents audio frequencies from being fed from the antenna to the reed relay system and blocks hum from the power supply to the amplifier. The triode section 22 of the multipurpose tube 20 is a power or grid leak type of detector to increase the sensitivity of the receiver. The sensitivity of the receiver is controlled by a potentiometer 18 connected in the plate-supply circuit of the triode section 22. The detected output from the triode section 22 is applied to the control grid of the pentode section 24 which ultimately drives a reed relay assembly 30. The pentode section 24 also provides limiting which is accomplished by applying a low screen grid and plate voltage and no cathode bias to the pentode section 24. Limiting is essential for good noise and interference immunity.

The reed relay assembly 30 has a coil 32 to which the audio frequency output of the pentode amplifier 24 is fed. A capacitor 25 tunes the reed coil 32 to the center frequency of audio to increase the receiver sensitivity and selectivity. A plurality of reeds 34, 36, 38 and 40 are associated with the coil 32 and adapted to be driven thereby. The audio signal from the pentode amplifier 24 sets up a magnetic field in the relay coil 32 which is driven at an audio rate. Since the metallic reeds 34, 36, 38 and 40 are located within the magnetic field of the coil, one of these reeds whose resonant frequency corresponds to the selected audio frequency is caused to vibrate thereby. Each of the four reeds resonate at a different frequency. Each of the individual reeds sets in motion the performance of a different function in the remote system. Each reed is connected by a resistor 42 and a feed through capacitor 44 which is incorporated on the structure of the reed relay to affect a low pass or VHF filter to remove spark noise between channels 2 through 13. Feed through capacitors are used to keep the filter inductance very low. The reeds 34, 36, 38 and 40 have sensitive relay coils 46, 48, 50 and 52 respectively. In turn, each relay coil 46, 48, 50 and 52 has associated therewith a relay arm and pair of contact points 56, 58, 60 and 62 respectively which contact points, when closed, perform its associated function. Accordingly, when the audio modulated magnetic field excites one of the reeds and causes it to vibrate, the reed contact is closed for a portion of one half cycle of reed vibration. The closing of a reed contact causes a current to flow through the reeds corresponding sensitive relay coil and the sensitive relay arm closes the contact points due to the magnetic field in the relay coil.

The different functions performed by the various relays will now be described. The "on-off" function which turns the television receiver "on" or "off" is performed by a two position latching relay 64 which is actuated by the closing of contact points 62. This relay operates in conjunction with the "on-off" switch 71 of the television receiver. The channel selection function is actuated by the relay 50 which closes contact points 60 to complete a circuit for supplying power to a power tuning motor mounted in a television receiver. This circuit is shown on the drawing as lines 70 and 72 which go to the motor. When the contact points 60 are closed, power is applied to the power tuning motor in the television receiver for rotating the tuner shaft thereby producing the channel selection function.

The increase or decrease in volume function is performed by supplying power to an A.C. reversible motor 74. Reeds 34 and 36 in conjunction with relays 46 and 48 provide this function. The motor 74 is mechanically coupled to a variable potentiometer 76 which, when moved by the motor 74, changes the screen grid voltage available to an audio IF amplifier tube 78 in the television receiver, or it may divide the audio signal from the detector output to the first audio amplifier.

The remote receiver contains its own transformer power supply. Alternating current power is provided for the television set through lines 79 and 80 and applied via the remote receiver "on-off" switch 82 to the primary of a transformer 84. The secondary of the transformer 84 applies the output thereof to a germanium diode 86 for half way rectification to provide a B+ supply for the remote receiver. The remote receiver "on-off" switch 82 should normally be left turned "on" so that it may receive control signals sent out by a remote transmitter unit. However, if the unit is not in use over a long extended period, it can be turned off.

The circuitry for performing the various control functions has been described generally as it is believed that its operation will be obvious to one skilled in the art in view of the completeness of the circuits which have been disclosed.

In order to more clearly understand the operation of the reed relay and its actuating circuitry, reference is now made to FIGURE 2 showing the basic circuit for the reed relay in the receiver. Each relay is provided with the same actuating circuit as shown on FIGURE 2. A resistor 90 is connected to a source of B+ supply which uses the germanium diode 86. The relay as labeled in FIGURE 2 has connected thereacross the capacitors 92 and 54. The resistor 42 is connected in series with the reed across the capacitor 54. Accordingly, when the reed is open or not actuated the capacitors 92 and 54 charge to B+ potential. On the closing of the reed relay the capacitors 92 and 54 discharge through the current limiting resistor 42 and the closed reed contact to ground. Curve A of FIGURE 3 shows the integrated discharge characteristic of capacitor 92 which discharges through the resistance provided by the relay and the resistor 42. Curve B of FIGURE 3 shows the integrated discharge characteristic of capacitor 54 which discharges through resistor 42 to ground. It will be noted that the time constant of the circuit including capacitor 92 is slow compared with that of the time constant of the circuit including capacitor 54. The resultant curve of these two RC networks provides the curve C (difference of voltage between curves A and B), which is the desired transient curve for the operation of the relay. The relay is set to operate by a heavy pull-in current and a low drop-out current which saves wear and tear on the reed relay contacts and prevents operation by interfering signals and noise. The relay pull-in time is long to prevent accidental operation. The pull-in current which is required to activate the relay is set such that approximately six full cycles of reed actuation are required before the relay will close its contacts. This prevents unwanted actuation by noise pulses or other interference signals. The drop-out time is very short in order not to overshoot on volume control or channel selection function. Accordingly, the relay contacts must open rapidly as soon as the received signal ceases. Although the curves on FIGURE 3 are shown as continuous curved lines, it will be appreciated that in actuality the curves are made up of small saw-toothed like portions caused by each closing of the reed such that the curves are actually resultant curves drawn from a series of jagged steps.

In an operative embodiment of the applicant's invention a set of circuit parameters which has been found satisfactory are as follows:

B+=130 volts
Resistor 90=12,000 ohms
Relay=2900 ohms
Resistor 42=680 ohms
Capacitor 92=20 microfarads
Capacitor 54=10 microfarads.

The disclosed remote control receiver system is relatively simple for the plurality of functions it performs. Only two electron discharge devices are required to provide the necessary amplification, detection and actuation of the reeds themselves for actuating their associated relays. Each relay circuit is designed such that a heavy pull-in current is supplied to the individual relay winding and only a low sustaining current is required thereafter for maintaining the circuit in operation. This relay actuation circuit saves wear and tear on the reed relay contacts, and prevents malfunction of the system.

Since other modifications and changes varied to fit particular operating requirements and environments will be apparent to those skilled in the art, the invention is not considered limited to the examples chosen for purposes of disclosure and cover all modifications which do not constitute departures from the true spirit and scope of this invention.

What I claim as new and desire to secure by Letters Patent of the United States is:

1. A remote control unit responsive to a plurality of signals having different predetermined frequencies for performing a plurality of control functions, a plurality of reed relay circuits each having a vibrating reed therein responsive to a different predetermined frequency for closing its associated circuit, a relay winding in each of said circuits having a pair of associated contacts which are adapted to be closed when said winding is energized to close circuits for performing the different control functions, each of said circuits including a relatively slow time network which constantly has a charging potential applied thereto and a relatively fast time constant network which is adapted to act rapidly once one of said reeds stops vibrating so that the contacts which were closed open as soon as the reed stops vibrating, said fast and slow time network further cooperating to require a relatively heavy pull-in current for closing the contacts of a winding and a relatively small drop-out current to open the contacts.

2. A remote control system responsive to a signal of predetermined frequency, a reed relay assembly having a vibrating reed which is responsive to and vibrated by a signal of predetermined frequency, a relay having a winding and a pair of contacts which are closed when said winding is energized, a first capacitor and a second capacitor connected across opposite ends of said winding to a point of reference potential, a resistor and said reed being connected across said second capacitor, means for charging said capacitors when said reed is inactive, said first capacitor being larger than said second capacitor and the discharge path of said first capacitor having a substantially greater resistance therein than that of the discharge path of said second capacitor whereby a larger current is required in said winding to close said contacts than to sustain the closed condition after initial actuation and allowing said contacts to open quickly after the reed stops vibrating.

3. A remote control unit responsive to a signal of predetermined frequency, a reed relay circuit having a vibrating reed which when activated in response to a predetermined signal periodically closes said circuit, a relay winding in said circuit having a pair of contacts associated therewith which are adapted to be closed when said winding is sufficiently energized, a first time constant network in said circuit adapted to be discharged through said relay winding when said circuit is closed by said vibrating reed, means for applying a potential to said first time constant network when said circuit is opened or closed, a second time constant network in said circuit having a substantially shorter time constant than said first time constant circuit whereby the relay requires a higher current to close its associated contacts than to maintain them closed after the initial closing and said contacts are opened rapidly when said reed stops vibrating.

4. A remote control receiver responsive to a signal of predetermined frequency, a reed relay assembly having a vibrating reed which is set into vibration by a signal of predetermined frequency, a relay in a relay circuit with said vibrating reed having contacts which are adapted to be closed when said relay is energized, a first and a second resistance-capacitance network in said relay circuits, means for charging at least one of said resistance-capacitance networks when said vibrating reed is not activated, said first resistance-capacitance network having a greater time constant than said second resistance-capacitance network such that said relay requires a greater actuation current than drop-out current.

References Cited in the file of this patent

UNITED STATES PATENTS 2,724,074 Welker ---------------- Nov. 15, 1955